Patented May 17, 1949

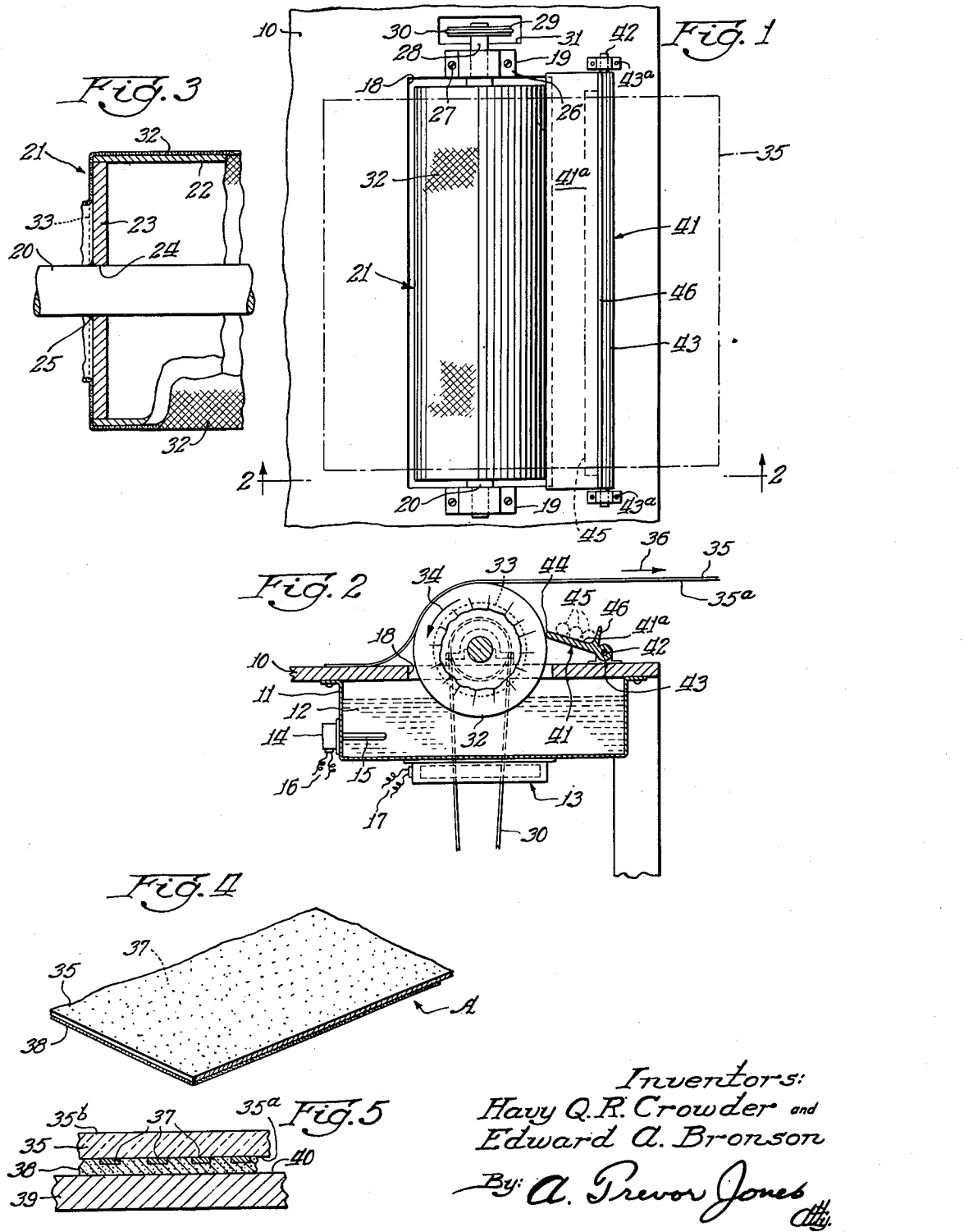

2,470,093

UNITED STATES PATENT OFFICE 2,470,093

APPARATUS FOR APPLYING WAX TO THIN SHEETS

Havy Q. R. Crowder, Altadena, and Edward A. Bronson, Pasadena, Calif.

Application August 6, 1945, Serial No. 609,064

2 Claims. (Cl. 91—51)

This invention relates to means for applying a hot coating such as wax to a thin sheet of cellulose material more particularly for composite transfer sheets and similar articles which are adapted to be used by artists, cartographers, draftsmen, engravers and the like for quickly producing backgrounds, shadings or identifying indicia on original sketches, drawings, maps, etc., to be later reproduced by a photographic process.

In Havy Q. R. Crowder Patent No. 1,820,867, issued August 25, 1931, there is broadly disclosed and claimed such a transfer sheet and method of making the same comprising a series of markings supported on a layer of thin transparent material and covered with a protecting layer of wax, which wax also acts as a vehicle for transferring the markings bodily onto a given surface. In a later patent to Crowder, No. 1,963,778, issued June 19, 1934, an improvement thereon is disclosed and claimed in which a layer of markings is permanently enclosed between the supporting layer of thin transparent material, on one side of the markings, and the layer of wax, on the other side of the markings, the markings thus being between the supporting layer and the wax layer and protected by both layers. Reference may be had to said patents for further explanation of the nature of such a transfer sheet and the manner and purpose of its use.

It is here sufficient to point out that the transfer sheet so constructed is commonly made and sold in standard rectangular sizes to the artist, for example, and with various patterns of markings, usually on different composite sheets so made and sold, the artist then selecting the sheet carrying the markings which he desires produced on the drawing and then, either before or after application to the drawing, cutting out, say to correspond with the irregular outline of the drawing, a segment of the sheet to be transferred.

It will thus be understood that the term "transfer sheet" as here used is inclusive of a composite sheet, comprising a flexible, transparent supporting layer, an intermediate layer of markings, and a layer of wax on the markings, a segment of which sheet, or the entire sheet, being superposed on a drawing or the like, to be generally thereafter photographed, the markings being visible through the supporting layer as though they were a part of the drawing, and appearing in the photograph as such, the supporting layer and layer of wax being substantially invisible to the camera and not appearing in the photograph as finally produced.

The present invention aims to provide improved method and means for producing such a transfer sheet which embodies the application of the wax to the supporting layer while the wax is hot and at the same time permits the use of a thin transparent material for the supporting layer, such material being desirably of a thermoplastic derivative such as cellulose acetate so as to provide the required strength together with a high degree of transparency and absence of color.

The invention will be readily understood by reference to the following detailed description, taken together with the accompanying drawings, of illustrative apparatus and preferred sequence of steps of operation, and in which drawings—

Figure 1 is a plan view of apparatus embodying the invention, a sheet being treated thereby being indicated diagrammatically;

Figure 2 is a vertical cross-section of the expedients shown in Figure 1 and being a section taken on the line 2—2 of Fig. 1, the sheet being here shown in full lines;

Figure 3 is an enlarged fragmentary axial section of one end of the applicator roller shown in Figs. 1 and 2;

Figure 4 is a perspective view of a portion of a composite sheet so produced; and Figure 5 is an exaggerated sectional view exemplifying use of the composite sheet on a drawing, illustrative fragments only of the sheet and drawing paper being shown, greatly enlarged.

Referring in detail to the illustrations of the drawings, the support 10 may be a table or the like upon the underside of which is suspended a sheet metal container 11 providing a reservoir for a bath of hot liquid 12, in this instance wax of a suitable composition, to form, when solidified in a layer or film on the transfer sheet, a coating which is slightly adhesive upon the application of pressure or friction to the upper side of the composite transfer sheet, while being separable from the drawing to which it may be attached without injury to the drawing or drawing sheet. A mixture comprising beeswax and paraffin is suitable and may be preferred.

Any suitable means, such as an electric heating element indicated in general by the numeral 13 may be employed to melt the wax to provide the hot liquid bath 12. A thermostatic device 14 having a temperature responsive element 15 projected within the bath 12 may be connected as by the wires 16 with the circuit 17 for the electric heating element 13 so as to control the latter and maintain the temperature of the melted wax at approximately the desired point, which may be, say 160° F. and within a suitable range thereabout.

Just above the center portion of the container 11 the table 10 is conveniently cut out as at 18 in an elongated opening, at each end of which and margining the opening the table carries a journal block 19, the pair of which afford bearings for the shaft 20 of an applicator roller 21. The roller 21 conveniently has a hollow cylindrical metal body 22 which is closed by end plates 23 which are perforated as at 24 to pass the shaft 20 therethrough, the latter being conveniently welded as at 25 to fix the roller on the shaft. The journal blocks 19 may be of laminated construction, the upper lamination of which 26 may be separable from the lower lamination as by unscrewing the screw bolts 27 to permit removal or replacement of the roller 21.

One end of the shaft 20 may be extended as at 28 to carry a pulley 29 for a belt 30 for rotating the roller as by any suitable driving means, for a purpose later herein to be described, the table top being conveniently slotted also as at 31 to pass the belt 30 downwardly therethrough. The driving means may rotate the roller at say fourteen revolutions per minute, and need not be further mentioned.

In accordance with the present invention, the cylindrical metal body 22 of the applicator roller 31 is enclosed or stockinged by a replaceable seamless covering 32 of a thin highly porous material and desirably of a cotton and wool mixture textile such as is used in women's hosiery of this type. The character of such material may be represented by a textile of fifty gauge, as it is called, for example. The textile covering 32 may be drawn over the roller body 22, somewhat like a stocking and at its ends may be shirred or gathered by stitching it as at 33 about the end plates 23 of the roller so that the textile material 32 is drawn snugly over the roller body without wrinkles or folds.

The applicator roller 21 is arranged to be rotated in the direction of the arrow 34 with a lower portion of the roller immersed in the bath 12 of hot liquid wax, a film of which is to be picked up by the roller and applied on the face 35a of the backing or supporting sheet 35, the latter being drawn manually over the rotating roller 21 in the direction of the arrow 36, which it will be noted is thus in an opposite direction to the movement of the periphery of the upper part of the roller as indicated by the arrow 34.

The flexible transparent supporting layer 35, before application to the roller 21, has printed upon its face 35a (by any suitable printing means not necessary to be here described) to which the wax coating is applied a series of indicia 37 which might be dots used for a shading background, or numerals, or any other indicia which it would be laborious for the artist to draw in by hand. As indicated in Figs. 4 and 5, the wax coating applied to the backing sheet 35, as already alluded to, finally provides a layer of cold wax 38, which functions as an adhesive, and the composite sheet so formed is somewhat in the manner of a sandwich, with outer layers 35 and 38 enclosing between them the printed indicia 37.

When a segment of this composite transfer sheet indicated by the letter A, is superposed on the drawing paper 39, the transfer sheet segment becomes for photographic purposes an integral part of the drawing appearing on the upper face 40 of the drawing paper 39. That is to say, by applying the transfer with the wax layer in contact with the drawing paper 39 and then frictionally pressing, as by a conventional burnishing tool, upon the upper face 35b of the backing 35, the cold wax of the layer 38 is warmed sufficiently to cause it to adhere to the surface 40 of the drawing paper upon which the drawing appears, that part of the drawing which is so covered being seen through the composite sheet with the indicia 37 appearing as though they were integral with the drawing and thus becoming a part thereof for photographic purposes for the making of plates, half-tones or the like.

Thus, the indicia 37 are protected by the backing 35 on one side and by the wax layer 38 on the other side. The burnishing tool does not touch the indicia, and at the same time the indicia do not touch the drawing, and if the artist desires to experiment say with different sizes of dots for shading, he may remove one transfer sheet and apply another repeatedly until he is satisfied with the appearance, and all without harming or affecting the drawing.

Further in accordance with the present invention, it has been found desirable to scrape lightly or doctor the surface of the stocking roller 21 just before applying the hot liquid wax thereby to the face 35a of the transparent backing sheet 35. For this purpose there is here shown wiper means in the form of a bar 41 extending the length of the roller 21 and hinged adjacent thereto as by means of a pintle 42 which passes through the longitudinally extending sleeve portion 43 of the bar and projects therebeyond at each end to pivot in hinge gudgeons 43a secured to the table top 10. The doctor bar 41 thus tends to drop by its own weight on its pivot 42 and lie up against the periphery of the applicator roller 21, where its somewhat rounded edge 44 bears upon the stocking 32 of the roller.

Thus excess wax which is picked up by the roller is removed therefrom and falls back into the container 11 and the wax on the portion of the roller which contacts the backing sheet 35 is rendered uniform and of a substantially predetermined thickness. Such predetermination of the thickness of the wax applied by the roller to the sheet 35 may be controlled by a plurality of weights, here shown in the form of weight rods 45 which may be laid on the bar 41 as required, the bar conveniently having an upstanding flange 46 defining with the main portion of the bar itself a trough-like formation 41a in which the rods 45 may be laid. As the stocking 32 wears and becomes thinner, weight rods 45 may be added to maintain the uniformity of the thickness of the wax coating delivered thereby to the backing sheet 35. By providing a plurality of weight rods 45, they may be added or removed as desired.

Since it is desirable, as already mentioned, to use for the transparent backing 35 a sheet of cellulose acetate, thereby securing a high degree of transparency and absence of color, such cellulose acetate sheet if applied directly to the hot metallic body 22 of the roller 21 would burn or distort from the heat of the metal of the roller, the temperature of which approximates the temperature of the bath of hot wax 12 and namely in the vicinity of 160° F. This temperature may be higher than cellulose acetate will stand without damage.

By reason however of the stocking 32, the sheet 35 may have the wax applied thereto without damage to the cellulose acetate sheet. It is believed that thereby the cellulose acetate sheet is insulated by the textile covering from the hot metal body 22 of the roller, and that also the film of hot wax which the roller picks up is also insulated from the hot metal body of the roller by the layer of textile material of the stocking 32. The wax itself cools rapidly, as it leaves the bath 12, and much more rapidly than the hot metal body 22 of the roller, so that the wax has already begun substantially to cool before being applied to the backing 35 and has substantially dropped in temperature from the temperature of the bath, while at the same time being still sufficiently fluid to be transferred to the backing sheet. By the time the backing sheet has been treated and is removed from contact with the roller, the wax has substantially solidified so that the composite sheets A may be stacked one upon another, with say protecting sheets of plain paper therebetween, without the wax adhering to such protecting sheets.

The invention is to be understood as not limited to details described for illustrative purposes, and such changes may be made as fall within the scope of the appended claims without departing from the invention.

The invention having been described, what is here claimed is:

1. Apparatus for applying a coating of wax to a very thin sheet of transparent cellulose acetate, embodying the combination with a heated reservoir for hot liquid wax, of a metal roller mounted for rotation partially in said liquid wax, and a thin highly porous seamless textile covering of sheer hosiery material on said roller, said covering serving as a medium for transferring a film of wax from the reservoir to the sheet when drawn over said roller while the roller is rotating.

2. Apparatus for applying a coating of wax to a very thin sheet of transparent cellulose acetate, embodying the combination with a reservoir for hot liquid wax, of a metal roller mounted for rotation partially in said liquid wax, a thin highly porous seamless textile covering of sheer hosiery material on said roller, said covering serving as a medium for transferring a film of wax from the reservoir to the sheet when drawn over said roller while the roller is rotating, means for rotating the roller in a direction opposite to the direction of movement of the sheet when applied thereto, electrical means for heating said wax in the reservoir, and a thermostatic device associated with said reservoir whereby the temperature of said wax may be controlled at a relatively high point higher than the heat distortion point of the sheet, said covering insulating the sheet from the hot metal of the roller and causing the wax while still flowable to be deposited on the sheet at a temperature lower than the temperature of the wax in said resesrvoir whereby the sheet is not distorted.

HAVY Q. R. CROWDER.
EDWARD A. BRONSON.

REFERENCES CITED

The following references are of record in the file of this patent:

UNITED STATES PATENTS

| Number | Name | Date |
| --- | --- | --- |
| 28,745 | Fuzzard | June 19, 1860 |
| 470,115 | Feldon | Mar. 1, 1892 |
| 474,013 | Hill | May 3, 1892 |
| 655,482 | Francis | Aug. 7, 1900 |
| 930,593 | Dunn | Aug. 10, 1909 |
| 1,024,549 | Becker | Apr. 30, 1912 |
| 1,044,656 | Howell | Nov. 19, 1912 |
| 1,152,596 | Boucher | Sept. 7, 1915 |
| 1,281,940 | Goedike | Oct. 15, 1918 |
| 2,080,127 | Goedike | May 11, 1937 |
| 2,117,200 | Miller | May 10, 1938 |
| 2,133,933 | Daley | Oct. 18, 1938 |
| 2,157,874 | Webb | May 9, 1939 |
| 2,159,949 | Hirsch | May 23, 1939 |
| 2,261,492 | Bauman | Nov. 4, 1941 |
| 2,372,755 | Abell | Apr. 3, 1945 |

FOREIGN PATENTS

| Number | Country | Date |
| --- | --- | --- |
| 827,837 | France | Feb. 2, 1938 |

OTHER REFERENCES

Fisher, Jr., Coating Paper, June 14, 1834.